(12) United States Patent
Ding et al.

(10) Patent No.: US 12,006,381 B2
(45) Date of Patent: Jun. 11, 2024

(54) DIELECTRIC ELASTOMERIC MATERIAL

(71) Applicant: NATIONAL UNIVERSITY OF SINGAPORE, Singapore (SG)

(72) Inventors: Jun Ding, Singapore (SG); Ramadan Abdelhamid Yousef Mohamed Borayek, Singapore (SG); Habimana Jean Willy, Singapore (SG)

(73) Assignee: NATIONAL UNIVERSITY OF SINGAPORE, Singapore (SG)

(*) Notice: Subject to any disclaimer, the term of this patent is extended or adjusted under 35 U.S.C. 154(b) by 122 days.

(21) Appl. No.: 17/514,159

(22) Filed: Oct. 29, 2021

(65) Prior Publication Data

US 2022/0135711 A1 May 5, 2022

(30) Foreign Application Priority Data

Oct. 30, 2020 (SG) .......................... 10202010858R

(51) Int. Cl.
| | |
|---|---|
| *C08F 20/18* | (2006.01) |
| *B33Y 70/00* | (2020.01) |
| *C08F 2/48* | (2006.01) |
| *H01B 1/12* | (2006.01) |

(52) U.S. Cl.
CPC .............. *C08F 20/18* (2013.01); *B33Y 70/00* (2014.12); *C08F 2/48* (2013.01); *H01B 1/122* (2013.01)

(58) Field of Classification Search
CPC .... C08F 20/18; C08F 2/48; C08F 8/14; C08F 120/20; B33Y 70/00; H01B 1/122
See application file for complete search history.

(56) References Cited

FOREIGN PATENT DOCUMENTS

| JP | 2004-315623 | * 11/2004 |
| JP | 2011-49073  | *  3/2011 |
| JP | 5720576     | *  4/2015 |
| JP | 2015-217127 | * 12/2015 |

OTHER PUBLICATIONS

Translation of JP 5720576 (Year: 2015).*
Translation of JP 2015-217127 (Year: 2015).*
Translation of JP 2004-315623 (Year: 2004).*
Translation of JP 2011-49073 (Year: 2011).*

* cited by examiner

*Primary Examiner* — Robert C Boyle
(74) *Attorney, Agent, or Firm* — Moore & Van Allen PLLC; Michael M. McCraw

(57) ABSTRACT

A dielectric elastomeric material having a permittivity of 20-65 at $10^3$ Hz is provided. The dielectric elastomeric material is formed from a composition comprising: a polymer comprising at least one acrylate monomer; a crosslinker; and a photoinitiator. A conductive elastomer comprising the dielectric elastomeric material, as well as a method of forming the dielectric elastomeric material, are also provided.

19 Claims, 16 Drawing Sheets

DIELECTRIC ELASTOMERIC MATERIAL

CROSS-REFERENCE TO RELATED APPLICATION

The present application claims the benefit of priority of Singapore Patent Application No. SG10202010858R, filed Oct. 30, 2020, the entire contents of which are hereby incorporated by reference in its entirety for all purposes.

TECHNICAL FIELD

The present invention relates to a dielectric elastomeric material and a method of forming the same.

BACKGROUND

Dielectric Elastomers (DE) are soft and perfect insulator polymers which are able to convert electrical energy into mechanical energy leading to change in its size and shape. Most of the challenges for DE systems are that they require a high voltage to actuate, as well as pre-stretching to suppress the electromechanical instability, and the need of passive structures to produce more complex shape changes.

While it is desirable for elastomers to have high permittivity so as to overcome the challenges mentioned above, it remains a challenge to find elastomers with improved permittivity but without compromising on electrical and mechanical properties such as high dielectric strength, perfect resistivity, and low Young's modulus.

There is therefore a need for an improved dielectric elastomer.

BRIEF SUMMARY

The present invention seeks to address these problems, and/or to provide an improved dielectric elastomeric material.

According to a first aspect, the present invention provides a dielectric elastomeric material having a dielectric constant of 20-65 at $10^3$ Hz, wherein the dielectric elastomeric material is formed from a composition comprising: a polymer comprising at least one acrylate monomer; a cross-linker; and a photoinitiator. The dielectric elastomeric material may be a 3D printable dielectric elastomeric material.

The acrylate monomer may be any suitable monomer. According to a particular aspect, the at least one acrylate monomer may be selected from the group comprising: hydroxypropyl acrylate (HPA), 2-hydroxyethyl acrylate, butyl acrylate, 2-carboxyethyl acrylate, or co-monomers thereof.

The cross-linker may be any suitable cross-linker. For example, the cross-linker may be selected from the group comprising: diethylene glycol, trimethyl methacrylate, 1,6 hexanediol diacrylate, or mixtures thereof. The composition may comprise a suitable amount of the cross-linker. In particular, the composition may comprise 5-25 vol % cross-linker based on the total weight of the composition.

The composition may further comprise a light absorber.

The dielectric elastomeric material may have a suitable Young's modulus. For example, the Young's modulus of the dielectric elastomeric material may be 0.2-0.5 MPa at 20% strain.

According to a particular aspect, the dielectric elastomeric material may have a glass transition temperature of −15 to −50° C. The dielectric elastomeric material may have a free end bending angle of 55°.

According to a second aspect, there is also provided a method of forming the dielectric elastomeric material according to the first aspect. The method comprises: mixing at least one acrylate monomer with a cross-linker to obtain a mixture; adding a photoinitiator to the mixture to obtain a photocurable mixture; and curing the photocurable mixture to obtain the dielectric elastomeric material.

The at least one acrylate monomer, cross-linker and photoinitiator may be as described above in relation to the first aspect.

The mixture may comprise a suitable amount of cross-linker. In particular, the mixing may comprise mixing the at least one acrylate monomer with 5-25 vol % cross-linker based on the total volume of the mixture.

The method may further comprise adding a light absorber to the mixture.

The curing may be by any suitable means. For example, the curing may comprise curing under an ultraviolet light source.

According to a particular aspect, the curing may comprise 3d-printing the photocurable mixture.

The present invention also provides, as a third aspect, a conductive elastomer comprising the dielectric elastomeric material according to the first aspect, and an ionic liquid. The ionic liquid may be any suitable ionic liquid. In particular, the ionic liquid may be a hydrophobic polar ionic liquid.

The conductive elastomer may be a near-hysteresis free conductive elastomer. Accordingly, the conductive elastomer may be used in various applications. For example, the conductive elastomer may be comprised in a sensor.

BRIEF DESCRIPTION OF THE SEVERAL VIEWS OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 15 shows FTIR peaks for the printed elastomers showing the crosslinking mechanism in which FIG. 15(a) shows OH peaks, FIG. 15(b) shows N=C and C=O peaks; and FIG. 15(c) shows C—N and C—H peaks. FIG. 15(d) shows gel fraction efficiency for different mixing rations of HPA monomer and the ionic liquid;

DETAILED DESCRIPTION

Figure 1:
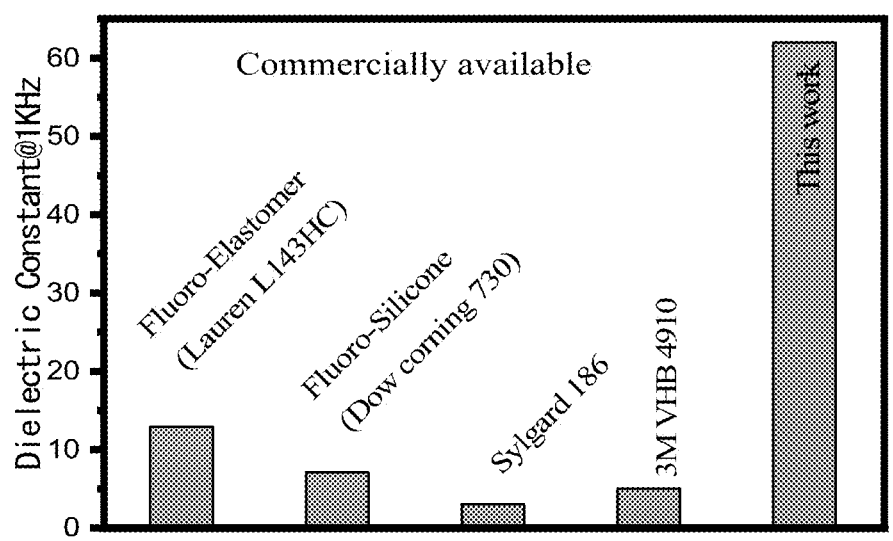
FIG. 1 shows a comparison of the dielectric constant of an embodiment with commercially available prior art dielectric elastomers.

As explained above, there is a need for an improved dielectric elastomer which has a high dielectric constant and yet continues to exhibit good electrical and mechanical properties such as high dielectric strength, perfect resistivity, and low Young's modulus.

In general terms, the invention relates to a dielectric elastomer which has ultra-high dielectric constant. The dielectric elastomer is also able to actuate at a very low electric field and produce giant out of plane deformations without requiring any pre-stretching or without being attached to passive layers or frames. Additionally, the dielectric elastomer may be 3D printable, enabling the elastomer to be used for forming complex geometries.

According to a first aspect, the present invention provides a dielectric elastomeric material having a dielectric constant of 20-65 at $10^3$ Hz, wherein the dielectric elastomeric material is formed from a composition comprising: a polymer comprising at least one acrylate monomer; a cross-linker; and a photoinitiator.

The polymer may be any suitable polymer. For the purposes of the present invention, reference to polymer comprises a polymer, oligomer, homopolymer, or copolymer. The polymer may be formed from any suitable monomer. According to a particular aspect, the polymer may be formed from at least one acrylate monomer. The acrylate monomer may be any suitable acrylate monomer and may comprise any suitable acrylate. The acrylate monomer may comprise many polar groups. For example, the acrylate monomer may be a low molecular weight monomer. In particular, the acrylate monomer may have a molecular weight in the range of 75-750 g/mol. For example, the molecular weight may be 100-700 g/mol, 105-650 g/mol, 110-600 g/mol, 120-550 g/mol, 150-500 g/mol, 200-450 g/mol, 250-400 g/mol, 300-350 g/mol. Even more in particular, the molecular weight may be 100-150 g/mol, particularly 105-120 g/mol.

According to a particular aspect, the at least one acrylate monomer may be, but not limited to: hydroxypropyl acrylate (HPA), 2-hydroxyethyl acrylate, butyl acrylate, 2-carboxyethyl acrylate, or co-monomers thereof. In particular, the at least one acrylate monomer may be HPA.

The cross-linker may be any suitable cross-linker. In particular, the cross-linker may be any suitable cross-linker which enables a suitable cross-linking mechanism in the polymerisation process in forming the polymer comprised in the dielectric elastomeric material. Even more in particular, the cross-linker may enable a cross-linking mechanism during the polymerisation process of the at least one acrylate monomer in which hydrogen bonding reaction between hydrogen of hydroxyl (OH) groups and oxygen of carbonyl (C=0) or ester (C—O) groups may occur. For example, the cross-linker may be, but not limited to: diethylene glycol (DEG), trimethyl methacrylate, 1,6 hexanediol diacrylate, or mixtures thereof. In particular, the cross-linker may be DEG.

The composition may comprise a suitable amount of cross-linker. In particular, the composition may comprise 5-25 vol % cross-linker based on the total volume of the composition. For example, the composition may comprise 7-22 vol %, 10-20 vol %, 12-18 vol %, 15-17 vol % cross-linker based on the total volume of the composition.

The composition may further comprise photocurable resin components. For example, the photocurable resin components may comprise suitable components such as, but not limited to, photoinitiator, light absorber, viscosity modifier, thermal modifier, or a combination thereof. In particular, the dielectric elastomeric material may comprise a photoinitiator, and optionally a light absorber.

The photoinitiator may be any suitable photoinitiator. For example, the photoinitiator may be, but not limited to, diphenyl (2,4,6-trimethylbenzoyl) phosphine oxide (TPO), 1-hydroxycyclohexyl phenyl ketone, or mixtures thereof. In particular, the photoinitiator may be TPO.

The composition may comprise a suitable amount of photoinitiator. For example, the composition may comprise 0.5-3 wt % of the photoinitiator based on the total weight of the composition. For example, the composition may comprise 0.8-2 wt %, 0.9-1.8 wt %, 1.0-1.5 wt %, 1.2-1.4 wt % photoinitiator based on the total weight of the composition. Even more in particular, the composition may comprise about 0.5 wt % based on the total weight of the composition.

The light absorber may be any suitable light absorber. For example, the light absorber may be, but not limited to, 2,5-bis(5-tert-butyl-benzoxazol-2-yl)thiophene.

The dielectric elastomeric material may have advantageous properties. In particular, the dielectric elastomeric material may have improved thermal, mechanical and/or electrochemical properties compared to prior art dielectric elastomeric materials.

According to a particular aspect, the dielectric elastomeric material may have a high dielectric constant. Dielectric constant (ε) may be defined as the measured polarizability when the dielectric elastomeric material is exposed to an electric field. The dielectric constant of the dielectric elastomeric material may be significantly higher as compared to the dielectric constant of dielectric elastomers known in the art, as shown in FIG. 1. The dielectric elastomeric material may have a dielectric constant of 5-65 at $10^3$ Hz. For example, the dielectric constant of the dielectric elastomeric material measured at $10^3$ Hz may be 10-60, 15-55, 20-50, 25-45, 30-40. In particular, the dielectric constant may be 20-65 at $10^3$ Hz. Even more in particular, the dielectric constant ay be about 60 at $10^3$ Hz.

The dielectric elastomeric material may have a high dielectric constant due to the presence of polar groups in the material. In use, the dielectric elastomeric material having such high dielectric constant may display high sensitivity. For example, the material may be used in displacement sensors. The use of the dielectric elastomeric material in an actuator may unexpectedly enable the actuator to actuate at a very low electric field and produce a higher area strain by producing giant out of plane deformations without requiring pre-stretching or attachment to passive layers. According to a particular embodiment, an actuator comprising the dielectric elastomeric material may be able to actuate at low voltages such as 600-800 V. In particular, the actuator may be able to actuate at a voltage of about 700 V.

According to another particular aspect, the dielectric elastomeric material may have a free end bending angle of ≤55°. In particular, the free end bending angle may be 5-55°, 10-50°, 15-45°, 20-40°, 25-35°. Even more in particular, the free end bending angle may be about 40°. The high free end bending angle may be achieved without any pre-stretching of the dielectric elastomeric or without attaching passive layers to the dielectric elastomeric material. Even more in particular, when the dielectric elastomeric material is arranged in a unimorph configuration as the active layer, the free end of the active layer may be able to bend towards the positive electrode. The dielectric elastomeric material may be able to bend in out of plane configurations.

The dielectric elastomeric material may have a suitable Young's modulus (E). For example, the Young's modulus of the dielectric elastomeric material may be 0.2-0.5 MPa at 20% strain. In particular, the Young's modulus may be 0.25-0.45 MPa, 0.3-0.4 MPa. Even more in particular, the Young's modulus may be about 0.2 MPa. The low Young's modulus of the material enables the material to product out of plane deformation without requiring supporting frames at lower electric fields.

According to a particular aspect, the dielectric elastomeric material may have a glass transition temperature of −15 to −50° C. With such low glass transition temperatures, high mechanical elasticity may be achieved and therefore the material may be used in a wide range of operations under different conditions. In particular, the glass transition temperature may be −20 to −45° C., −25 to −40° C., −30 to −35° C. Even more in particular, the glass transition temperature may be about −50° C.

The dielectric elastomeric material may be a 3D printable dielectric elastomeric material. In this way, complex geometries may be 3D printed from the dielectric elastomeric material. According to a particular aspect, the dielectric elastomeric material may be 3D printed into any particular shape and size based on ultraviolet (UV) light 3D printing. For example, an elastomer may be 3D printed from the dielectric elastomeric material according to the present invention and shaped in a geometry which may be able to reduce the stiffness of the elastomer, which in turn may reduce the driving voltage.

Thus, it can be seen that the dielectric elastomeric material of the present invention has excellent properties without requiring any additional support such as frames, or the need for pre-stretching in order to achieve the properties mentioned.

According to a second aspect, there is also provided a method of forming the dielectric elastomeric material according to the first aspect. The method comprises: mixing at least one acrylate monomer with a cross-linker in a solvent to obtain a mixture; adding a photoinitiator to the mixture to obtain a photocurable mixture; and curing the photocurable mixture to obtain the dielectric elastomeric material.

The at least one acrylate monomer, cross-linker and photoinitiator may be any suitable acrylate monomer, cross-linker and photoinitiator. In particular, the acrylate monomer, cross-linker and photoinitiator may be as described above.

The method may further comprise adding a light absorber to the mixture. The light absorber may be any suitable light absorber. In particular, the light absorber may be as described above.

The mixture may comprise a suitable amount of cross-linker. In particular, the mixture may comprise 5-25 vol % cross-linker based on the total volume of the mixture. For example, the mixture may comprise 7-22 vol %, 10-20 vol %, 12-18 vol %, 15-17 vol cross-linker based on the total volume of the mixture.

The photocurable mixture may comprise a suitable amount of photoinitiator. For example, the photocurable mixture may comprise 0.5-3 wt % of the photoinitiator based on the total weight of the photocurable mixture. For example, the photocurable mixture may comprise 0.8-2 wt %, 0.9-1.8 wt %, 1.0-1.5 wt %, 1.2-1.4 wt % photoinitiator based on the total weight of the photocurable mixture. Even more in particular, the photocurable mixture may comprise about 0.5 wt % based on the total weight of the photocurable mixture.

The mixing may be under suitable conditions. For example, the mixing may be under constant stirring.

The curing may be by any suitable means. For example, the curing may comprise curing under an ultraviolet (UV) light source. Any suitable UV light source may be used for the curing.

According to a particular aspect, the curing may comprise 3D-printing the photocurable mixture. The 3D-printing may be by any suitable 3D printer. The 3D-printing may be by any suitable 3D-printing method. In particular, the 3D-printing comprised 3D-printing using UV light.

According to a third aspect, the present invention also provides a conductive elastomer comprising the dielectric elastomeric material described above, and an ionic liquid.

The ionic liquid may be any suitable ionic liquid. In particular, the ionic liquid may be a hydrophobic polar ionic liquid. For example, the ionic liquid may be, but not limited to, 1-Ethyl-3-methylimidazolium bis(trifluoromethylsulfonyl)imide (EMITFSI), 1-butyl-3-methylimidazolium bis(trifluoromethanesulfonyl)imide, 1-ethyl-3-methylimidazolium bis(fluorosulfonyl)imide, or a mixture thereof. The ionic liquid may not comprise any hydroxyl groups, thereby making it highly stable.

The conductive elastomer may comprise ≤50 vol % ionic liquid based on the total volume of the conductive elastomer. In particular, the conductive elastomer may comprise 5-50 vol %, 10-45 vol %, 15-40 vol %, 20-35 vol %, 25-30 vol % ionic liquid. Even more in particular, the conductive elastomer may comprise ≤15 vol % ionic liquid.

The conductive elastomer may be a near-hysteresis free conductive elastomer. In particular, the conductive elastomer may be highly elastic and stretchable. The conductive elastomer may be stretched to up to 10 times its initial length. For example, the conductive elastomer may have low hysteresis of ≤2%. This may be due to the short chain monomers and cross-linking mechanism in the formation of the dielectric elastomeric material, as well as the hydrophobic ionic liquid comprised in the conductive elastomer which forms ion-dipole and dipole-dipole interactions with the dielectric elastomeric material comprised in the conductive elastomer. In particular, during stretching, the H-bonds formed during the polymerisation allow the material to elongate more than the conventional covalent bonds. The conductive elastomer of the present invention exhibits a good combination of high stretchability with low hysteresis, making the elastomer suitable for use in sensors, particularly detecting movement signals accurately and under high deformations.

In particular, the conductive elastomer may have a mechanical hysteresis of about 2% and an electromechanical hysteresis of ≤1.2%.

The conductive elastomer may have a high transparency. For example, at 500 nm, the conductive elastomer may have a transparency of about 85-92%. In this way, the conductive elastomer may also be used in applications in which transparent conductors are required.

The conductive elastomer may have a suitable conductivity. According to a particular aspect, the conductive elastomer may have a conductivity of 8-10 mS/cm.

The conductive elastomers may be very stable. For example, the conductive elastomers may be able to generate highly stable and repeatable signals under cyclic tension and bending stresses for more than 10,000 cycles. This shows that the conductive elastomer does not lose its accuracy, particularly when used in sensing applications.

The conductive elastomer of the present application may also exhibit self-healing. According to a particular aspect, the conductive elastomer may have a self-healing efficiency of 80-92% after a 24-hour period. In particular, the self-healing may be due to the ion-dipole and dipole-dipole interaction between the monomer dipoles of the dielectric elastomeric material comprised in the conductive elastomer and the ionic liquid ions. The ionic liquid may have cations and anions which may interact with the dipoles existing on the monomer backbone, thereby self-healing the damaged conductive elastomer through ion-dipole and dipole-dipole reactions.

Accordingly, the conductive elastomer may be used in various applications. For example, the conductive elastomer may be comprised in a sensor or used as a material in artificial skin applications. In particular, the conductive elastomer may be used in various sensing applications, such as, but not limited to, smart gloves for monitoring movement of fingers, touch sensors for electronics, and the like. The conductive elastomer may also be used in energy storage applications such as flexible and stretching batteries and capacitors or by blending it with other nanoparticles to improve the performance for use in super capacitors or battery applications such as electrolytes or electrodes.

Having now generally described the invention, the same will be more readily understood through reference to the following embodiment which is provided by way of illustration, and is not intended to be limiting.

Example

Example 1

Preparation of Dielectric Elastomer 99.5 g of Hydroxypropyl acrylate, mixture of isomers (HPA; from Sigma Aldrich) as monomer, 0.5 g (i.e. 0.5 wt %) of diphenyl (2,4,6-trimethylbenzoyl) phosphine oxide (TPO; from Sigma Aldrich) as photoinitiator and 0.05 g (i.e. 0.05 g/100 ml) 2,5-Bis(5-tert-butyl-benzoxazol-2-yl)thiophene (from Sigma Aldrich) as light absorber were mixed in Nalgene amber bottle for 30 minutes under ambient conditions until all solid powders were completely dissolved to obtain a fully transparent photocurable mixture.

Thereafter, different amounts (i.e. 5, 10, 15, 20 and 25 g) of diethylene glycol (DEG; from Sigma Aldrich) as crosslinker was added in different Nalgene amber bottles containing the photocurable mixture formed above. The mixtures were named D0 to D25, with the number indicating the percentage of DEG added to the mixture. In particular, the mixture to which 25 vol % DEG was added was named D25 while D0 referred to a mixture which did not comprise any DEG.

The photocurable mixtures were then 3D-printed to print and cure the material. A UV 3D printer (Asiga, DLP) was used which utilised UV light to cure and print the photocurable mixtures. In particular, the 3D printer worked by a top-down DLP system with a digital mirror device and a UV-LED light source at 385 nm. After printing, the printed objects were washed by sonication for 20 minutes to remove any residual uncured mixture and dried in ambient temperature for 20 minutes.

Characterisation

The crosslinking mechanism of the formed dielectric elastomers was mainly comprised hydrogen bonding reaction between the hydrogen of the hydroxyl groups (OH) and the oxygen of the carbonyl or ester groups (C=O) (C—O). Mainly, HPA as a main monomer mixed with crosslinker and plasticizer, DEG. However, HPA was only able to form a cross-linked elastomer network after polymerization through the H-bonding reactions. To prove the polymerization and the cross-linking mechanism was through the H-bonding reaction, a series of FT-IR were done for the liquid and the printed parts for all the investigated elastomers. The results are as shown in FIG. 2.

Figure 2:
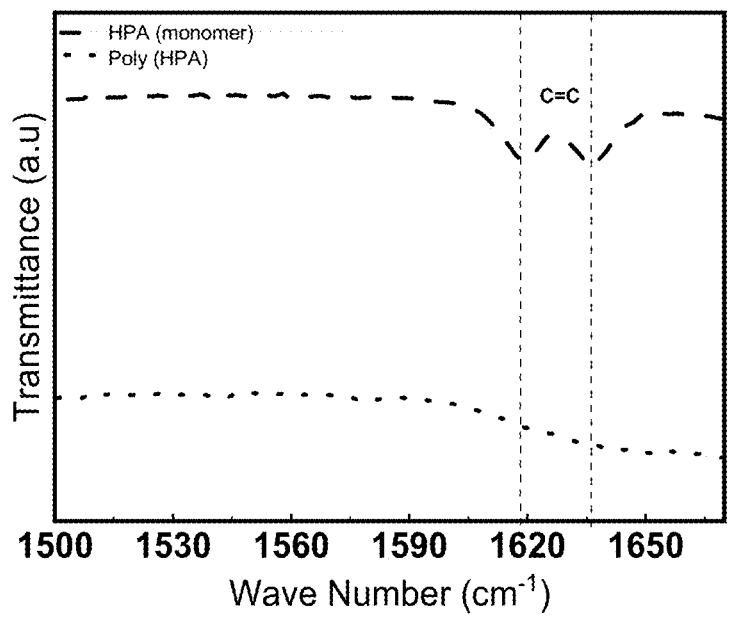
FIG. 2 shows FTIR spectrum for the liquid monomer and printed elastomer of HPA.

For polymerization, as can be seen from the FT-IR results of FIG. 2, the peaks at 1619 cm$^{-1}$ and 1631 cm$^{-1}$ belong to the C=C vinyl stretching group for HPA liquid monomer. However, for all the polymerized formulations, those peaks did not exist which proves that the polymerization was through the opening of the carbon double bond to an extended network of carbon single bonds.

The formulation comprising only HPA monomer mixed with the photo initiator and the light absorber showed a highly stretchable elastomer being formed, up to 5.5 times stretchability with 0.23 MPa for Young's modulus. However, the resultant elastomer from this formulation was highly elastic but still had a high Young's modulus and high glass transition temperature ($T_g$), which was not preferred for most of DE applications. Indeed, mixing HPA with DEG as a cross-linker and plasticizer improved the mechanical, thermal and electrochemical properties of the resultant elastomer.

Figure 3:
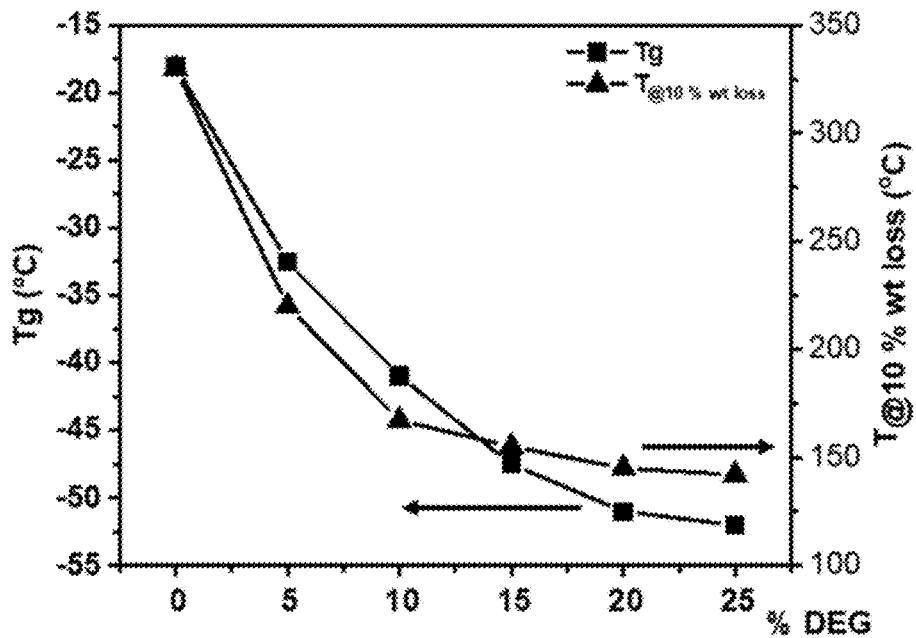
FIG. 3 shows effect of diethylene glycol content on $T_g$ and thermal stability of the elastomers.

With increasing DEG in the formulations, $T_g$ of the resultant elastomer witnessed a significance decrease from −18° C. for D0 and reaching −52° C. for D25, while all the formulations showed a significance variation for the thermal stability under heating, as seen in FIG. 3.

Figure 4:
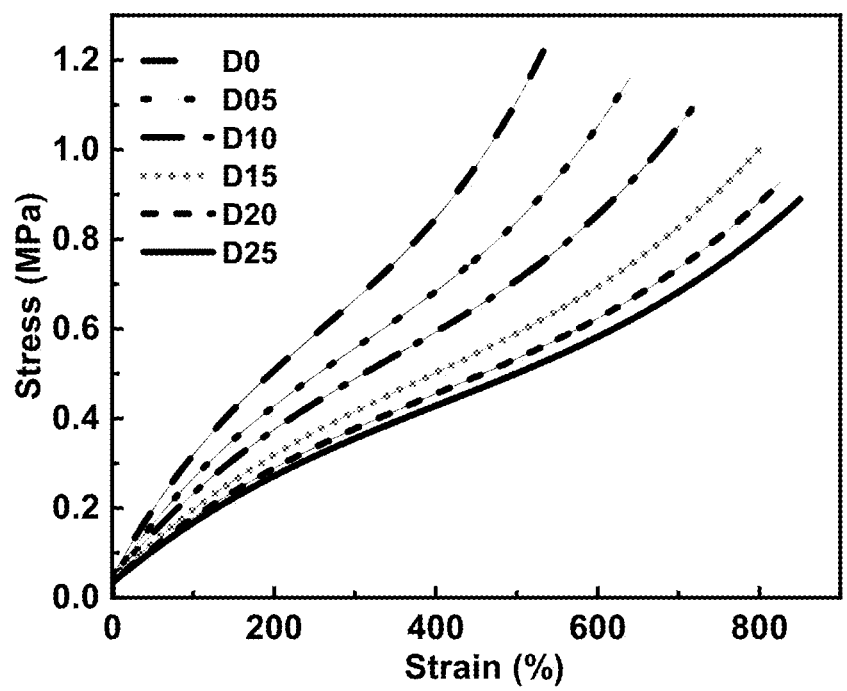
FIG. 4 shows variation of diethylene glycol content and its effect on the mechanical stress-strain behaviour under tension for the elastomers.

In addition, by increasing the percentage of DEG in the formulation, the resultant elastomer showed improved stretchability with decrease in ultimate tensile strength which resulted in reducing the stiffness of the elastomers, as can be seen in FIG. 4.

Figure 5:
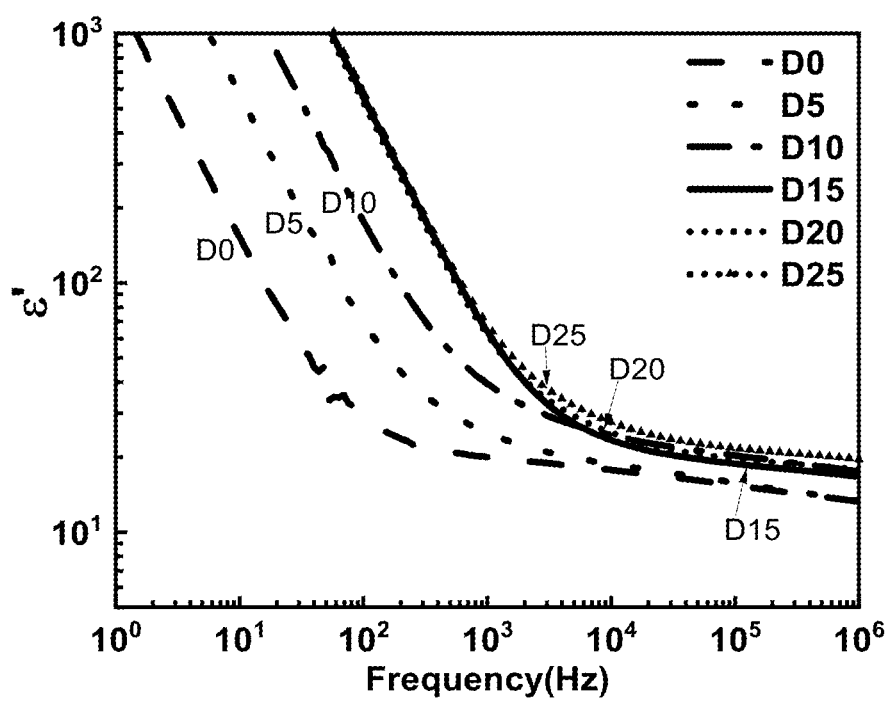
FIG. 5 shows effect of diethylene glycol on the dielectric constant of the elastomers.

The presence of the polar groups (C═O and O—H) in the formulations gave a high permittivity for the printed elastomers, as can be seen in FIG. 5. Not only do the presence of these polar groups contribute to the permittivity, but also its existence with a high density compared to the molecular weight of the monomers and cross-linkers used. The permittivity of the elastomer is the measured polarizability when the elastomer is exposed to electric field. In the case of polar dielectrics, the important polarization mechanisms are the orientation and the interfacial polarization. In the orientation mechanism, the dipoles oriented in the opposite direction of the electric field leading to an increase in the accumulated charges in the dielectric surfaces. As a result, the elastomers rich by polar groups had an improvement in permittivity. The interfacial polarization mechanism was a characteristic for the elastomers with fast ion migration between the electrode material and the surface of the dielectric elastomer, leading to high permittivity values at low frequencies.

FIG. 5 shows that the printed elastomers have high and controllable dielectric constant ($\epsilon$) ranging from 20 for D0 to 65 for D25 103 Hz. The increase in the dielectric constant may be due to the presence of the hydroxyl groups existing at the end of DEG chains.

However, the increase in dielectric constant reversely affects the values of the conductivity of the resultant elastomers. The conductivity of D0 elastomers was $10^{-9}$ S/cm, while conductivity for D25 elastomers increased to reach $10^{-7}$ at 1 Hz.

To appraise the actuation performance of the printed elastomers, the fabricated samples in two different aspects were tested: First was the bending angle of the free end in unimorph configuration, and the second was the area strain in response to the electric field.

Figure 6:
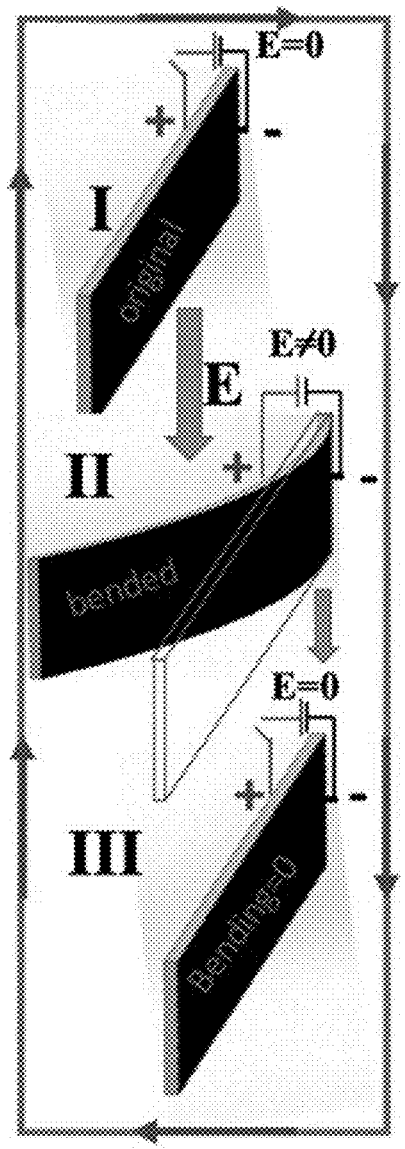
FIG. 6 shows a schematic representation of the working principle of the dielectric elastomer.

Unimorph actuation of a 10×40×1 mm$^3$ (1 mm thickness) bulk sample was evaluated without pre-stretching or without adding a passive layer. A schematic representation of the working principle of the dielectric elastomer is shown in FIG. 6. By applying an electric field through the thickness of the elastomer, the free end of the elastomer stripe was able to bend clearly without any obstacles.

Figure 7:
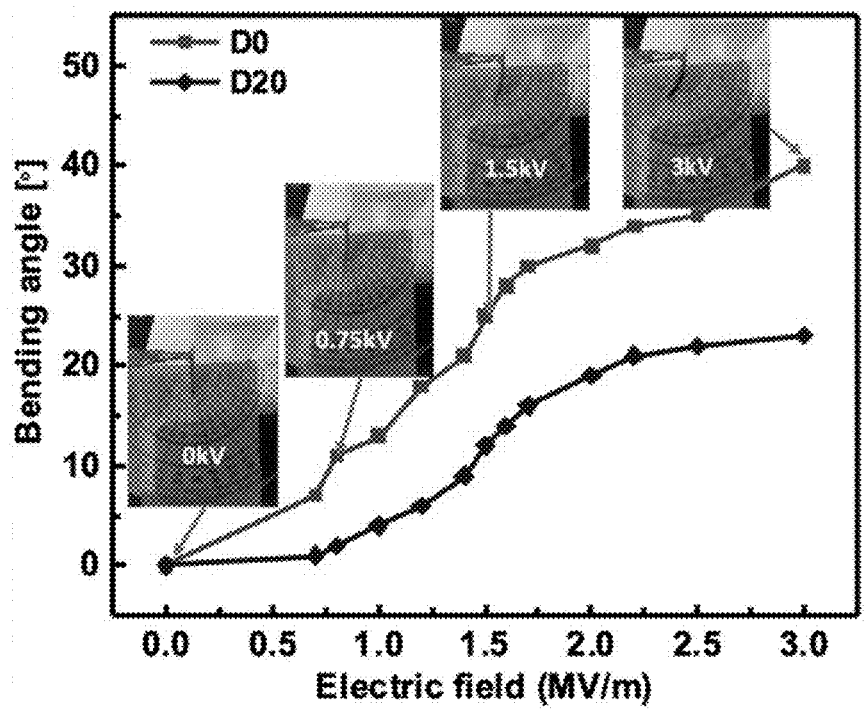
FIG. 7 shows free end bending angle of the dielectric elastomer in response to different applied electric fields.

As shown in FIG. 7, the elastomer was able to produce large bending angles at different applied electric fields. The maximum angle the elastomer was able to bend was 40° at an electric field of 3 MV/m. It was also found that by increasing the electric field, the elastomer with these dimensions was not able to produce bending angles larger than 40°. When applying an electric field through the thickness of a highly polar elastomer, two forces were generated. The first one was due to the Columbic attraction between the opposite charges on both sides of the elastomer film, i.e. Columbic forces. The second one was the force due to the alignment of the dipoles in the opposite direction of the respective electrodes. The resultant force, in the case of the elastomers, led to a novel out of plane bending behaviour without the need to pre-stretch the elastomer film or without attaching passive layer to the elastomer surface, as seen in FIG. 7.

Furthermore, an experiment was designed to understand the full phenomena of the novel bending without the need for pre-stretching and without attaching a passive layer. First, it was noted that the elastomers always bent to the side of the positive electrode. Three different patches of the elastomer were printed separately, with each patch comprising 30 samples. Then, 20 samples were randomly tested from each patch separately and it was found that all the samples bent to the side of the positive electrode.

Figure 8:
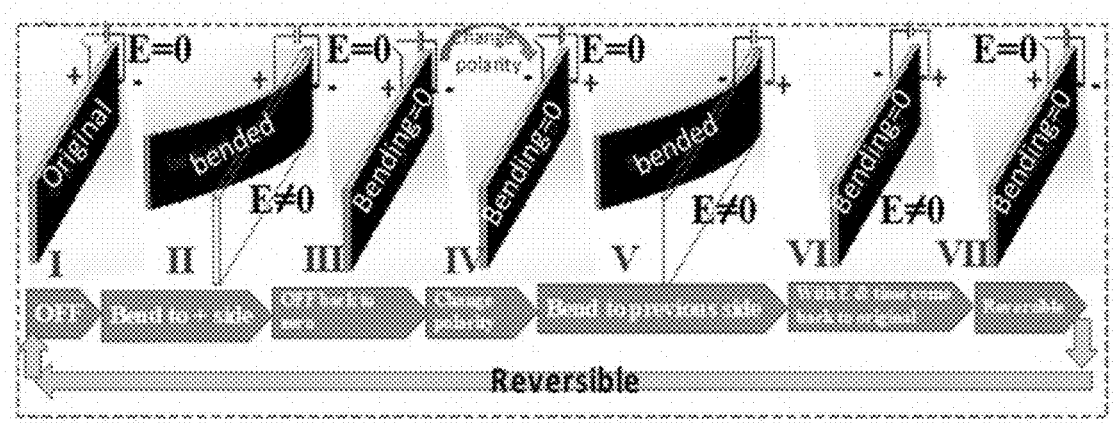
FIG. 8 shows a schematic representation of the full working cycle for the bending angle of the dielectric elastomer.
Figure 9:
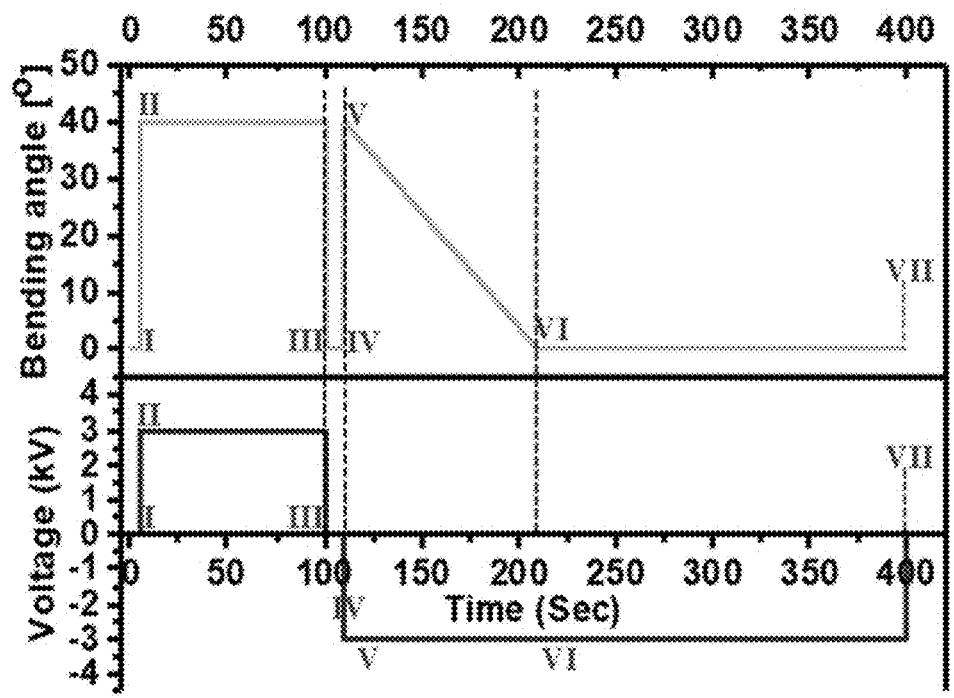
FIG. 9 shows response time and the bending angle of the dielectric elastomer of a sample chosen from DO under an electric field.

After testing all the samples, the actuated samples were tested by changing the polarity of the electrodes. As shown in the schematic representation of FIG. 8, under the effect of the electric field, the samples were found to immediately bend to the side of the positive electrode once the electric field was applied (stage I and II of FIG. 8), and when the electric field was switched off, the samples responded immediately and came back to the original position (stage III of FIG. 8). At stage IV, the polarity of the electrode was changed electric field was applied at stage V. The samples still bent to the previous side, which was the negative electrode this time. However, upon allowing sufficient time of an average of about 400 seconds, the samples returned back to the original position again while it still under the electric field, as shown at stage VI of FIG. 8. Then, by switching off the electric field and changing the polarity again to the original state (stage VII of FIG. 8), the elastomer was able to produce the same process again from stage I to stage VI. The response time and the changes to the bending angle throughout the various stages as shown in FIG. 8 is shown in FIG. 9. This shows that the elastomer may be useful in applications in which out of plane deformations may be expected, such as, but not limited to, fabrication of soft robotic devices.

Figure 10:
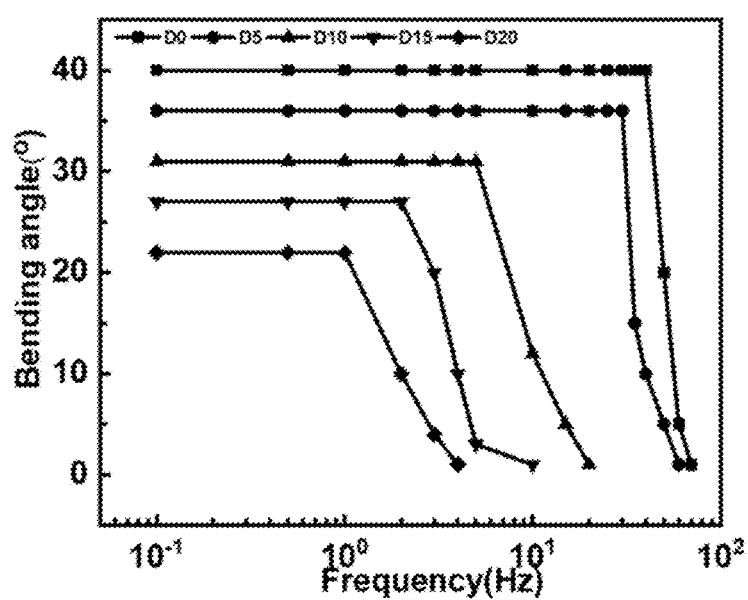
FIG. 10 shows response of the dielectric elastomer materials to the applied frequency.

FIG. 10 shows the relationship between the maximum bending angle and the applied frequency. Elastomers fabricated from D0 could bend to maximum angle of 40° with an electric field of 3 MV/m and maximum frequency of 60 Hz, which may facilitate the use of the elastomeric material in the field of soft flying\swimming robots without any constraints.

Figure 11:
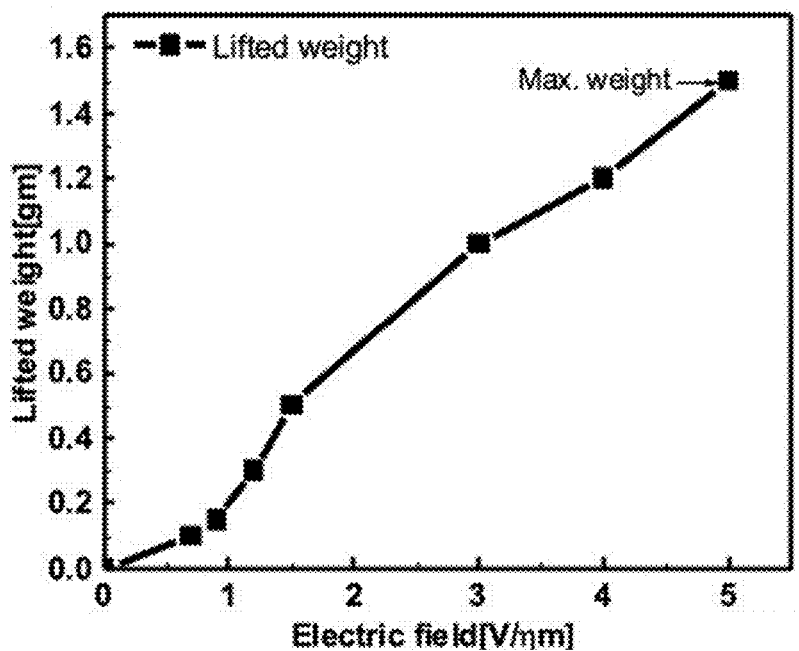
FIG. 11 shows the relationship between the applied electric field and the lifted weight for the soft gripper.

A soft gripper based on a single layer fabricated was formed from elastomer of material D0, having 1 mm thickness, 10 mm width and 20 mm length. It was able to catch, hold and release a cylindrical polymer weighing 1.5 g. It was also able to do the same for a hollow cylindrical paper weighing 0.2 g without causing damage to the body of the cylinder. The relationship between the electric field and the maximum weight that the device can lift is shown in FIG. 11. It is obvious that a piece of elastomer, although weighing just 0.2 g may hold a weight of 1.5 g, which is 7 times its own weight. Accordingly, the elastomer of the present invention may be used as a supporting structure for other more complex structures.

Figure 12:
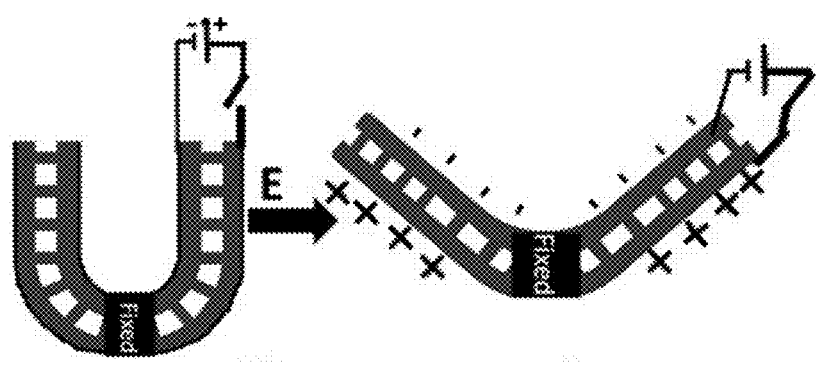
FIG. 12 shows a schematic representation of a printed robotic arm actuating at low electric field without pre-stretch or without attaching passive layers to the elastomer film.
Figure 13:
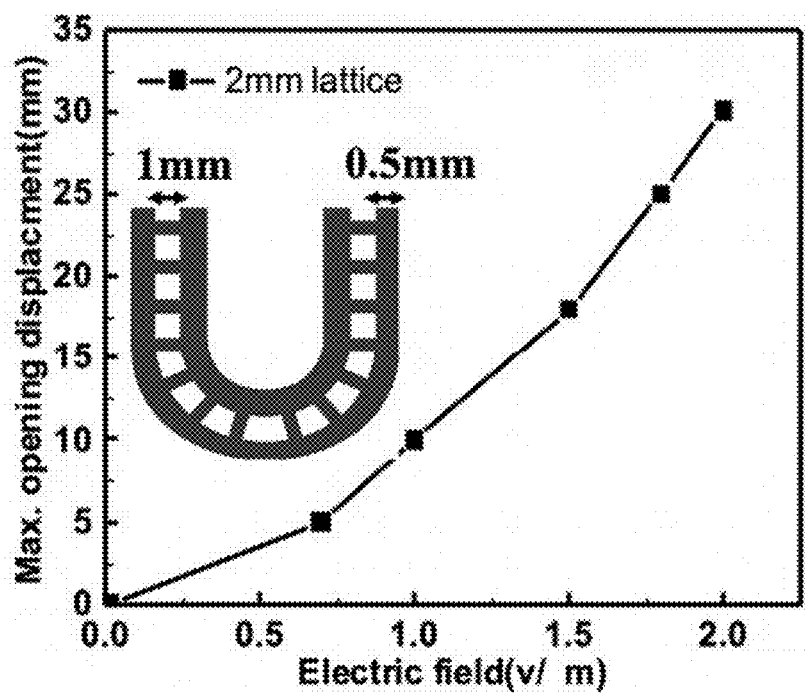
FIG. 13 shows the relationship between the opening displacement and the applied electric field for the printed robotic arm.

FIG. 12 provides a schematic representation of a printed robotic arm which was configured to actuate at low electric fields without any pre-stretch or without attaching any passive layers to the elastomer. The arm was fabricated from elastomer D20 with a hollow cross-section area (1 mm diameter pillars sandwiched between two faces of 0.5 mm layer thickness). The printed arm had a total thickness of 2 mm and could open until a displacement of 30 mm under an electric field of 2 kV/mm, as can be seen in FIG. 13. This allows the elastomer to be used as a soft robotic arm with a proper strength. This configuration of the arm was 2 mm thick, which gives a proper strength instead of using a thin layer attached to passive layers to actuate at lower electric field and to produce more shape change. The printed lattice structure had a hollow cross section area, which provided a very low stiffness for the whole structure. Based on this, thick structures may be actuated at relatively low electric fields.

Based on the above, it can be seen that the elastomeric material enables fabrication of hollow structures to reduce and geometrically control Young's modulus, and which allows bending actuation for thicker structures to occur. These results have not been achievable using methods in the state of the art.

Example 2

Materials

Hydroxypropyl acrylate (HPA) as a mixture of isomers, containing 900-1100 ppm, 4-methoxyphenol, Diethylene Glycol (DEG), diphenyl (2,4,6-trimethylbenzoyl) phosphine oxide (TPO), 2,5-bis(5-tert-butyl-benzoxazol-2-yl) thiophene, 1-Ethyl-3-methylimidazolium bis(trifluoromethylsulfonyl) imide)(EMITFSI), 1-Ethyl-3-methylimidazolium tetrafluoroborate, (EMIMB4) and 1-Ethyl-3-methylimidazolium trifluoromethanesulfonate (EMITFS) were purchased from Sigma Aldrich and were used without further purifications. Carbon conductive grease had been purchased from Mouser Electronics, USA, and used as received.

Formulation of Photocurable Conductive Elastomers

The conductive elastomers were formed by mixing HPA monomer with 2 wt % DEG. Ionic liquid (EMITFSI) was added in a vol % from 0 to 25%. Other photocurable resin components, such as a photo initiator (diphenyl (2,4,6-trimethylbenzoyl) phosphine oxide), and light absorber (2,5-bis(5-tert-butyl-benzoxazol-2-yl)thiophene) were added to allow the printability of the elastomers. The amount of the photo initiator and the light absorber were fixed in all formulations to 1 wt % for the photoinitiator and 0.05 g/100 mL for the light absorber.

The whole mixture was placed in an amber glass bottle and put under magnetic stirring for 6 hours until a very clear homogenous solution was obtained. The final solution for each formulation was a very clear homogenous mixture suitable for Digital Light Processing (DLP) 3D printing using UV light. The liquid formulations which were to be printed by extrusion printing were adjusted by adding fumed silica to the liquid formulations in a ratio of 1:2 wt % from fumed silica to the liquid resin.

Printing of Photocurable Conductive Elastomers

Asiga Pico2™ HD 385 nm (Asiga; Australia) printer was used to print all the resins formulations. The printer worked by a top-down DLP system with a digital mirror device (DMD) and a UV-LED light source (385 nm). The required structures were drawn using SolidWorks software from DASSAULT Systems and saved in .stl file formats. The structures were then uploaded to the software attached to the printer. After printing, the printed objects were transferred carefully from the printer platform to a solution of Isopropyl Alcohol (IPA) for washing by sonication for 20 minutes to remove the residual uncured monomers, and then dried in ambient temperature for 20 minutes. The washed structures were post-cured in an Asiga flash UV box for 30 minutes. The final product was a soft, conductive, highly transparent and highly stretchable elastomer.

Characterisation

Figure 14:
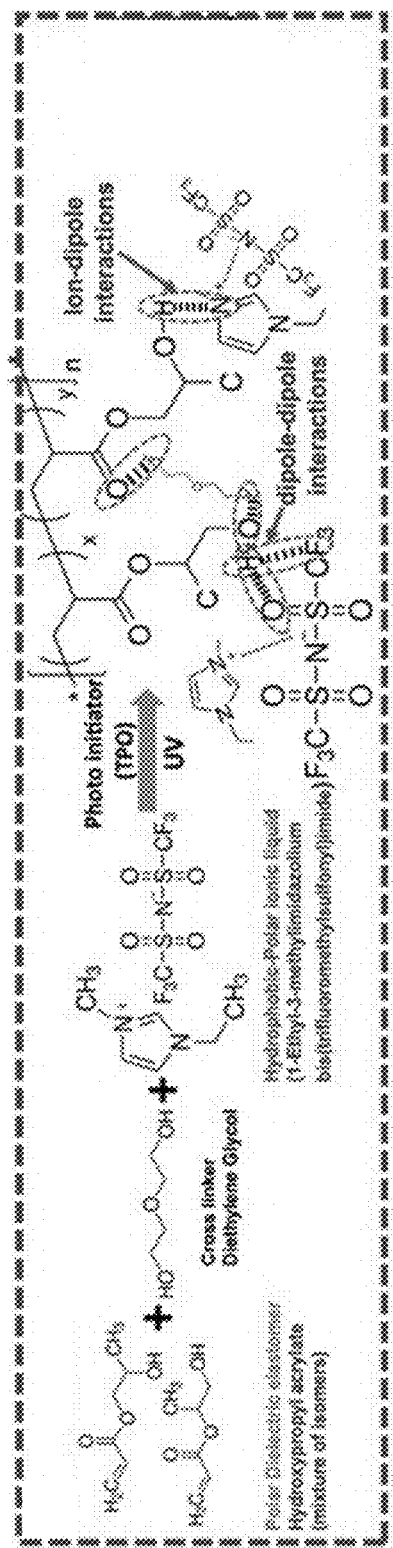
FIG. 14 shows a schematic representation of the polymerization chemical reaction between the low molecular weight HPA with short chains and the hydrophobic polar ionic liquid.

A schematic representation of the main cross-linking mechanism in the formation of the conductive elastomers is as shown in FIG. 14. In particular, the cross-linking was based on H-bonding reactions, which provide a highly elastic and stable signal under long-term cyclic loading.

Figure 15:
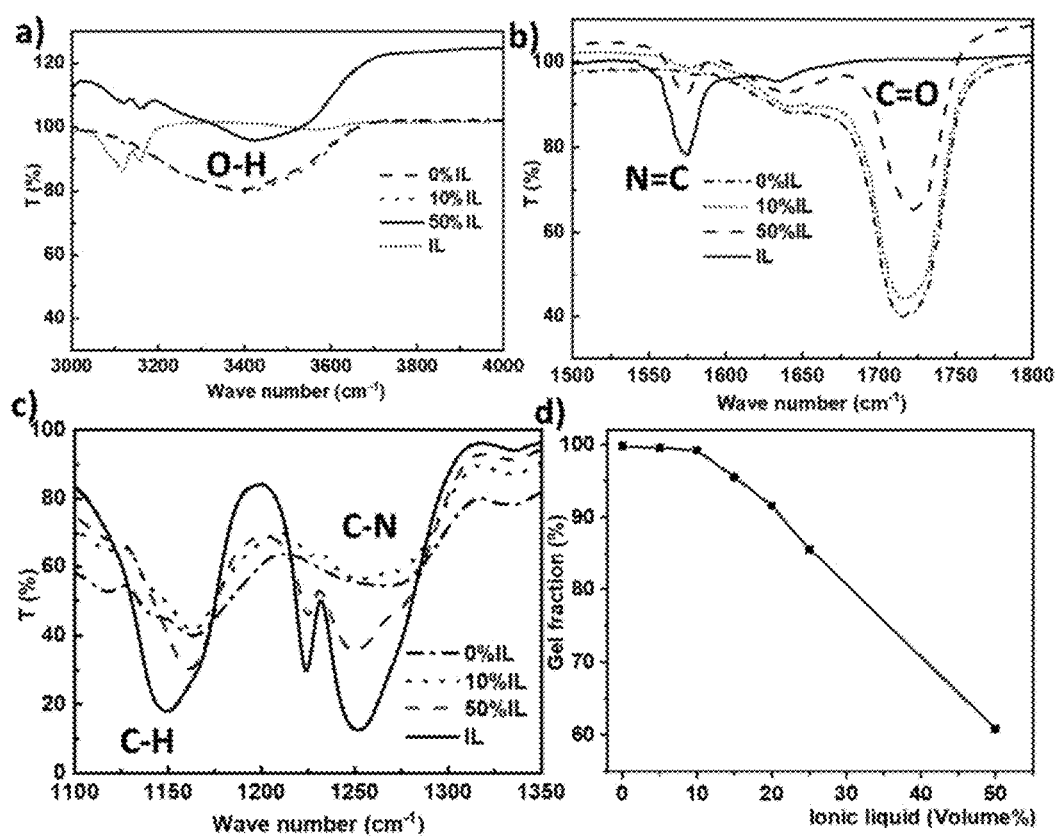

The results shown in FIG. 15 is a representative for the most sensitive peaks to the polymerization and H-bonding reaction of the conductive elastomer formulations. FIG. 15(a) provides the OH peaks for the ionic liquid and the ionic liquid mixed with HPA monomer and DEG cross-linker. The ionic liquid did not contain any hydroxyl groups, which makes it highly stable in the open environment. The FTIR of the liquid ionic liquid proved this as there were no peaks relevant to any hydroxyl groups in the range of 3000 cm$^{-1}$ to 4000 cm$^{-1}$. It was observed that the elastomer HPA had a hydroxyl group at 3400 cm$^{-1}$ and that it existed with different intensities in the other formulations containing the ionic liquid. This showed the successful doping of the ionic liquid in the conductive elastomer network. The same may be expected for carbonyl groups (C=O), as can be seen in FIG. 15(b). The peaks have an intensity at 1742 cm$^{-1}$ related to the C=O of the elastomer without any ionic liquid and also with 10 vol % of ionic liquid. However, it varied in intensity and shifted to 1748 cm$^{-1}$ as the volume percentage of the ionic liquid increased from 10 vol % to 50 vol %, which also showed that the ionic liquid linked to the elastomer network through the H-bonding between the O of the carbonyl groups and the H connected to the N of the ionic liquid in the conductive elastomer network. FIG. 15(b) also represents the C=N peak for the ionic liquid and ionic liquid doped with different percentages in the elastomer network. From the presented results, it can be seen that only the ionic liquid has the peak of C=N while the elastomer without the ionic liquid does not show any peak at this wavelength range. However, the peak starts to appear in the formulations with ionic liquid with different intensities, which again shows the cross-linking mechanism of the ionic liquid and the HPA monomer.

For photopolymerization, FIG. 15(b) showed that for all of the printed elastomers, there were no peaks in the range of 1600 cm$^{-1}$ to 1650 cm$^{-1}$, which proves the polymerization process is through the opening of the C=C bond to a single C—C bond to build the elastomer network. FIG. 15(c) shows the peaks of the C—H and C—N which exist in the ionic liquid, however by doping such ions in the elastomer network, the existence of such peaks with different intensities for different volume percentage was observed. The existence of such peaks in all the elastomer formulations proved the successful dropping of the ions in the polymer network. The doping of the ionic liquid in the elastomer network was limited by the miscibility and the compatibility of the two mixed systems (HPA monomer and Ionic liquid (EMIMB4)).

To find the optimum value of doping the ionic liquid in the elastomer network, gel fraction was measured and the results are as shown in FIG. 15(d). It was observed that by increasing the volume percentage of the ionic liquids beyond 50%, the gel fraction efficiency decreased, which indicates the poor linking of the ionic liquid to the elastomer network for percentages more than 50 vol %. Moreover, all the mixed formulations showed a very high transparency whereas the formulations with 0 vol % and 50 vol % showed a high transparency of 91% at wavelength of 500 nm.

Figure 16:
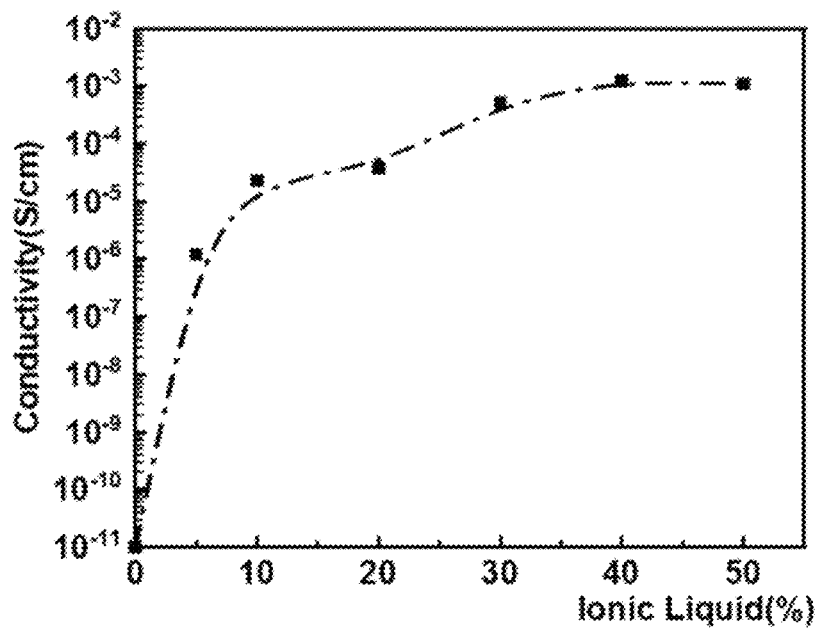
FIG. 16 shows the effect of the ionic liquid vol. % on the conductivity of the elastomer.

The conductivity of the elastomers was initiated from the successful doping of the ionic liquid into the elastomer network. FIG. 16 shows the effect of the ionic liquid vol % on the conductivity of the elastomers. Increasing the ionic liquid percentage rapidly increased the conductivity at the initial doping amounts. However, by adding more ionic liquid the conductivity did not change the conductivity value rapidly or the conductivity remained constant. In particular, the conductive elastomers with ionic liquid percentage of 30 vol % to 50 vol % witnessed a conductivity of 8 mS/cm and 10 mS/cm respectively. These values indicated that the doping of more than 50 vol % of ionic liquid into the elastomer network did not affect the conductivity value too much which was consistent with the results of the gel fraction efficiency as shown in FIG. 15(d).

Figure 17:
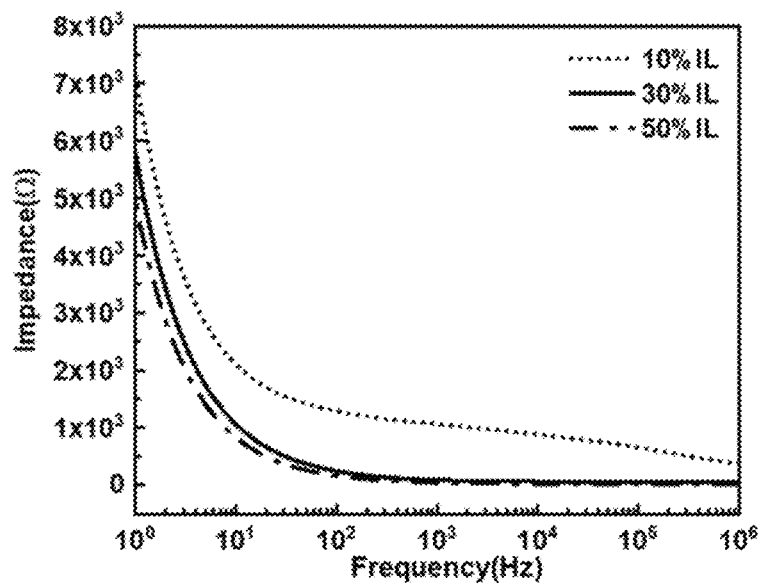
FIG. 17 shows variation of the impedance under the change of frequency for different ionic liquid loading.

FIG. 17 is the representation of the impedance with the change of frequency. From FIG. 17, it can be seen that all formulations have constant value of impedance in the range of 102 Hz to 106 Hz. Accordingly, the elastomers may be used in different applications which need such behavior under alternating current sources such as, but not limited to, touch screens and panels.

Figure 18:
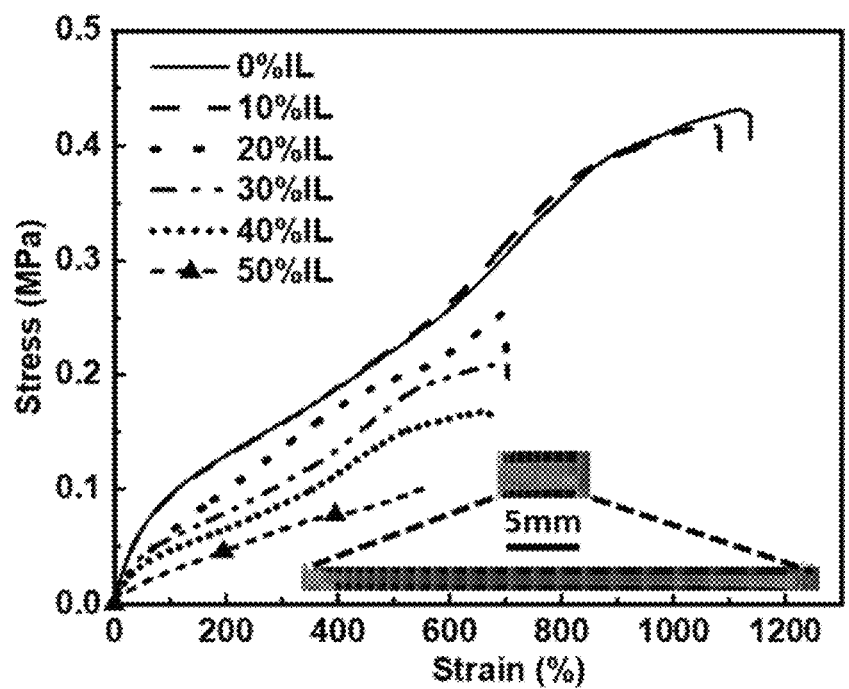
FIG. 18 shows tensile stress-strain behaviour of the ionic conducting elastomers with different vol. % loading of ionic liquid (inset with a photo for the stretched elastomer)
Figure 19:
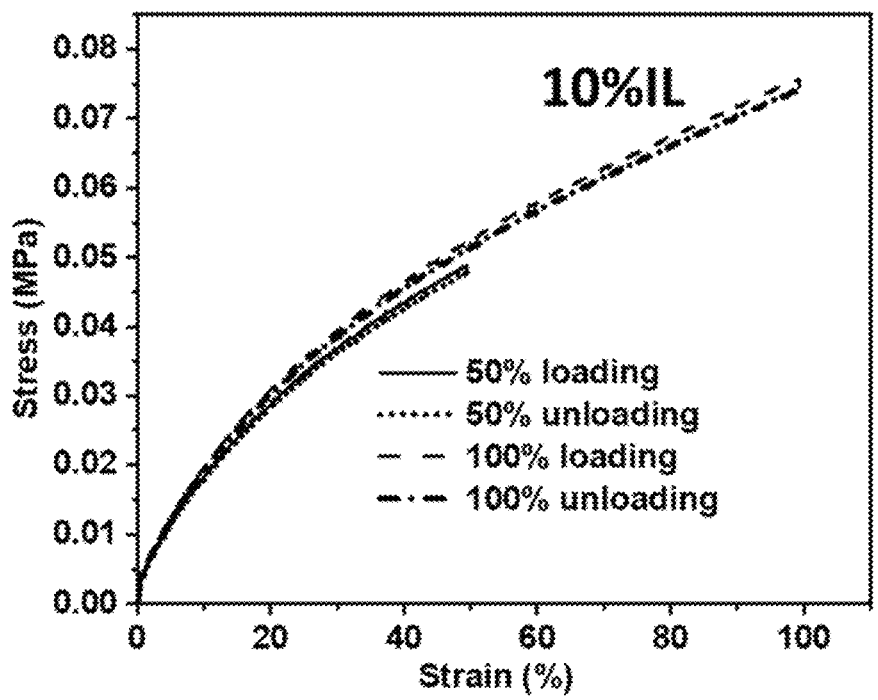
FIG. 19 shows cyclic tensile stress-strain behaviour of elastomer with 10 vol. % ionic liquid loading.
Figure 20:
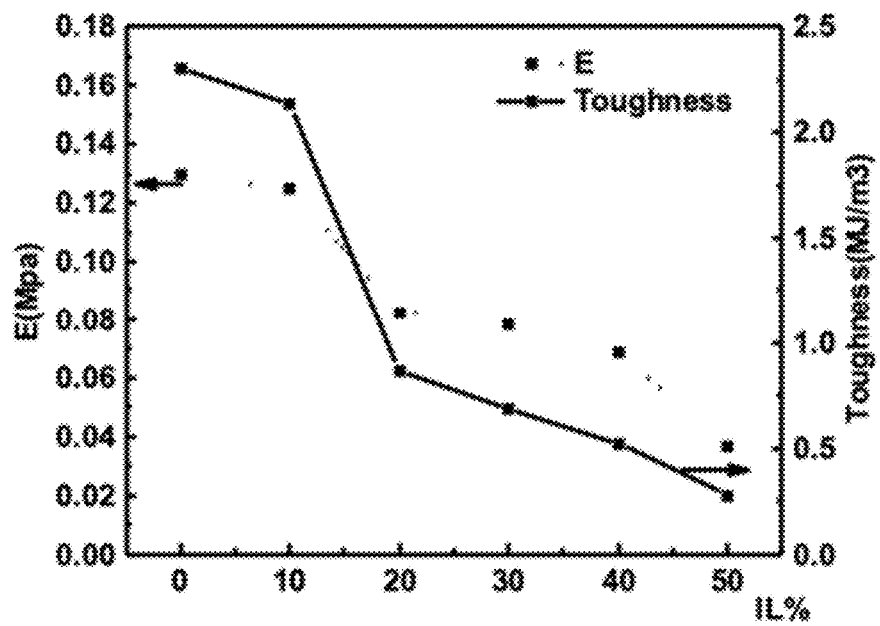
FIG. 20 shows effect of ionic liquid on the value of Young's modulus and toughness of the ionic conducting elastomers.

The investigated elastomers showed a unique mechanical behavior in terms of elasticity. As shown in FIG. 18, the elastomer could stretch more than 10 times their original length. Even cyclic loading tests of the elastomers showed a highly elastic behavior (hysteresis free). FIG. 19 shows the results for the highly conductive formulation (10% ionic liquid loading) under cyclic tension mechanical loading, whereas the elastomer showed a near hysteresis free behavior. The hysteresis free behavior of the elastomers is as a result of the polymerization process and the cross-linking mechanism. The elastomers showed the hysteresis free behavior not only under small strains but also under high strain loadings up to 5 times stretchability. The formulations resulted in the formation of soft stretchable elastomers with hysteresis free behavior. Such elastomers may be suitable in electronic skin applications to allow soft movement with high stability of signal acquiring without much stress on the body connections like fingers and wrist joints. The Young's modules of the elastomers with different formulations ratios was in the range of 0.13 MPa for 0 vol % IL until it reached 0.04 MPa for the formulations with 50 vol % IL, as can be seen in FIG. 20. By increasing the IL amounts in the elastomer formulations, the Young's modules and toughness of the elastomers decreased due to the cross-linking mechanism. In H-bonding cross-linking reactions, the increase in cross-linking led to a decrease in the stretchability and strength, unlike in traditional cross-linking mechanisms.

The conductive elastomers also showed high electrical self-healing efficiency. In particular, after cutting the conductive elastomer and immediately joining a piece of the elastomer back, the conductive elastomer was still able to conduct electricity and act as a touch sensor. This may be due to the ionic liquid comprising positive and negative ions which interact with the dipoles on the monomer backbone enabling the self-healing through H-bonding reactions.

Figure 21:
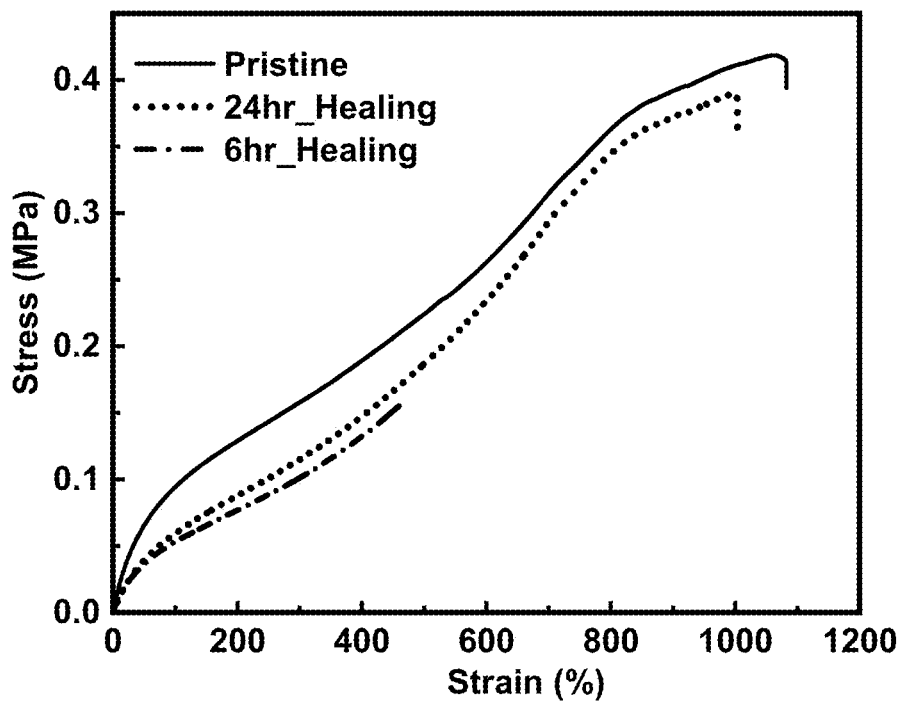
FIG. 21 shows tensile stress-strain characteristics of self-healed elastomer with maximum ionic liquid loading.
Figure 22:
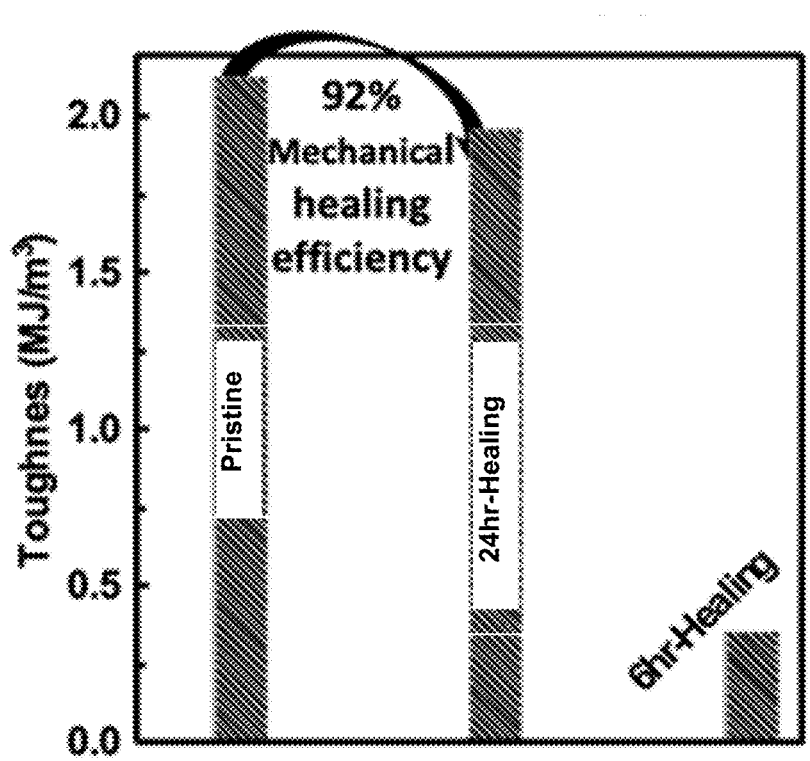
FIG. 22 shows a comparison of the toughness for the self-healed and the pristine ionic conducting elastomer with time.

FIG. 21 is a representation of the self-healing behavior of the investigated ionic elastomers. The mechanical self-healing efficiency may reach up to 92% after 24 hours of self-healing time. FIG. 22 is a histogram showing the relationship between the time and self-healing efficiency in relation to the toughness. It's obvious that with allowing more time the dipoles and the ions can achieve a self-healing efficiency up to 92% of the pristine elastomers.

The sensitivity and stability of the conductive elastomers were investigated under cyclic loadings. The electrical hysteresis behavior of the ionic elastomers under high mechanical tensile strains up to more than 3 times stretchability was investigated. The conductive elastomers showed almost linear electrical behavior under mechanical cyclic tension loading and almost zero electrical hysteresis under mechanical loading up to 3 times stretchability. The gauge factor, which is the relation between the change of electrical resistance and original resistance to the change of mechanical strain, showed almost a linear relationship between electrical and mechanical behavior which is common for such ionic conductors. However, the results obtained were for rectangular bars printed from the conductive elastomer with dimensions of 10 mm×40 mm with 1 mm thickness.

To improve sensitivity (gauge factor) for such ionic conductors, 3D printed structures for Auxetic (Re-entrant) structures were printed and investigated experimentally and validated by simulations using ANSYS Multiphysics software under mechanical tension loadings. It was observed that by using 3D printing, it was helpful to improve the resistivity by order of 3 times when using Auxetic structures instead of rectangular bars. Thus, the conductive elastomers may be used in applications for accurate and stabile signal acquiring for long-term stability.

As a proof of concept applications of the conductive elastomer, a smart glove which can monitor the movement of the hand fingers with high accuracy and with very long-term stability was manufactured comprising sensors formed from the conductive elastomer.

Figure 23:
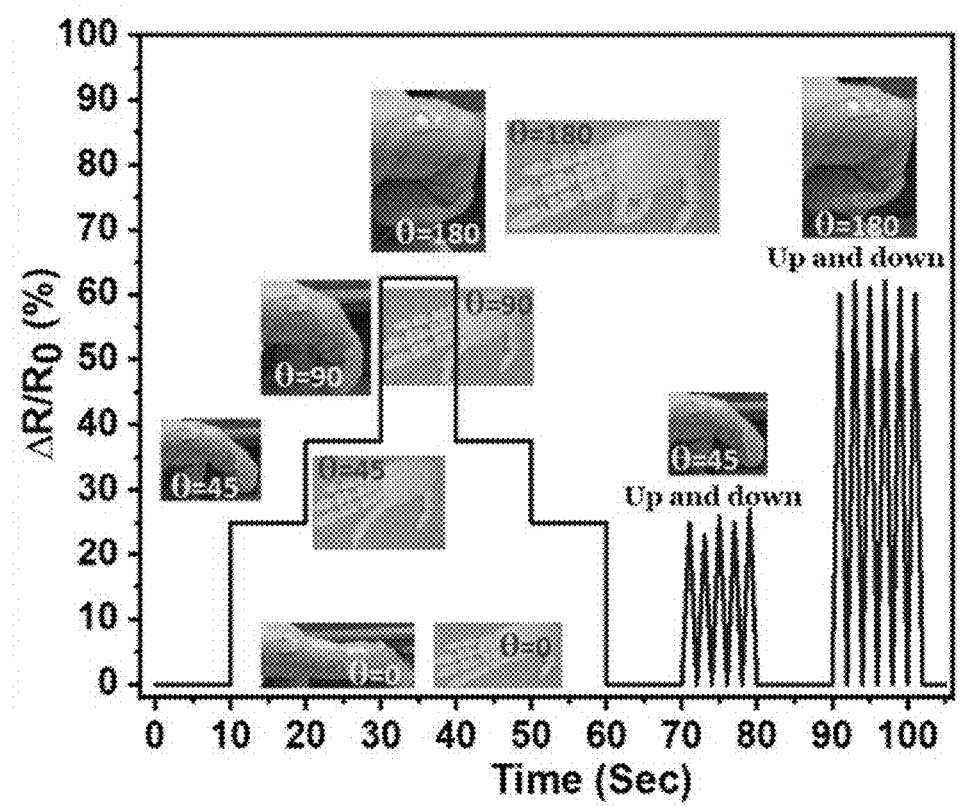
FIG. 23 shows change in electrical resistance with the approximate bending angle of the finger at different positions.

The smart glove was based on a strain sensors connected or directly printed to the glove fingers. Because of the hysteresis free behavior of the conductive elastomer, the attached sensors to the fingers were able to generate a highly sensitive and differentiable electric signals under the bending of the fingers. In order to simulate the hand, the conductive elastomer was prepared with 10% ionic liquid concentration among many concentrations to achieve the balance between conductivity and mechanical properties. Five rectangular bars with the Auxetic structure shape were printed directly on the glove material using robocasting 3D printing technique. The two ends of each structure were connected with 5V and 0V voltages respectively, and the signal transmission wires were connected at the center, and the center was aligned with the knuckles. The advantage of this design is that when a finger bends, it's easy to receive the signals from both ends. Even if there is a contact problem at one end, it can be simply adjusted without affecting the use of the glove. When each finger was stretching, the elongation of the material was different. The change in the electrical resistance with the change in the bending angle of the fingers is shown in FIG. 23.

Figure 24:
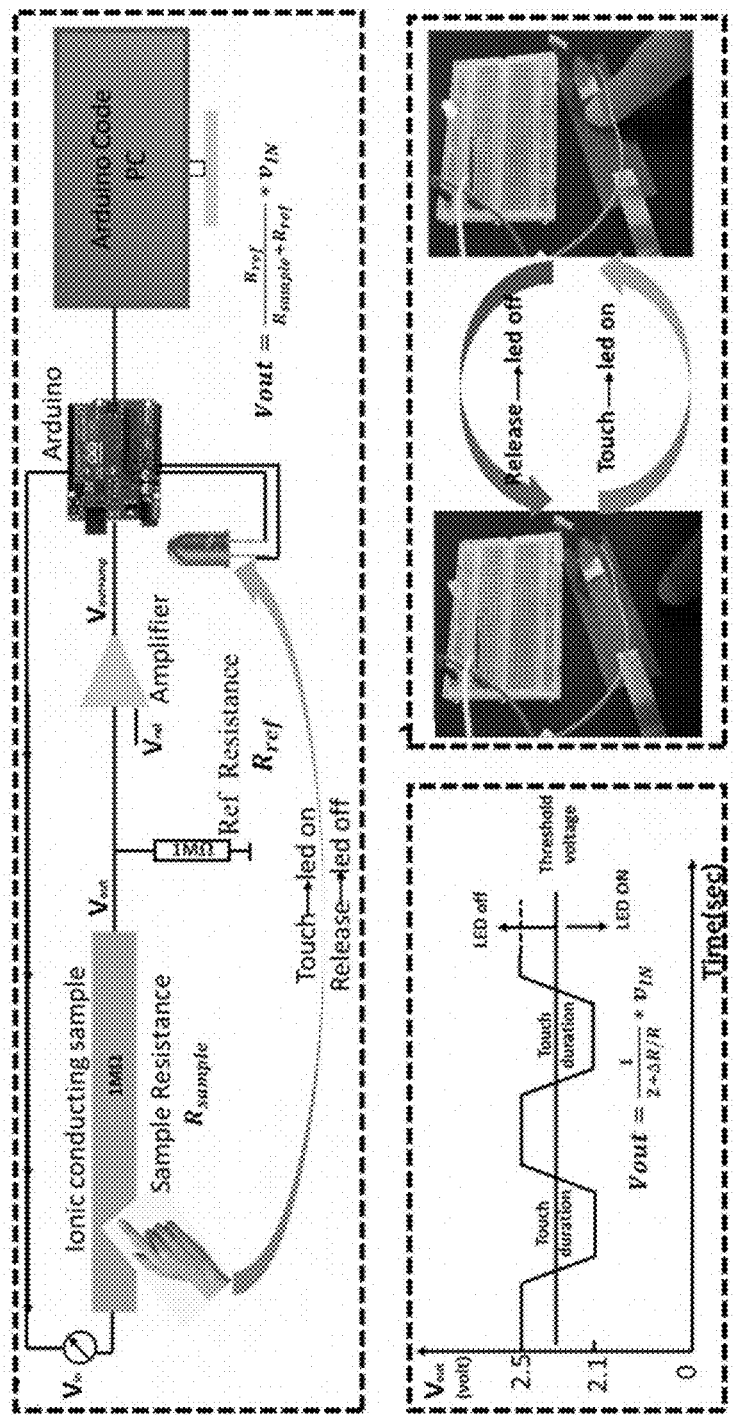
FIG. 24 shows a schematic representation of the touch sensor electrical circuit.

The second application in which the conductive elastomer was used was a touch sensor working under DC current with very simple electronics. The conductive elastomer worked as a touch sensor with a DC current for a flat specimen connected with two electrodes without using any patterned structure, as shown in FIG. 24, instead of using AC current. The main design of such sensor started by using a piece of the ionic conductive elastomer as a touch stimulus object. It was then programmed using simple Arduino microcontroller based on changing the resistance value once a human finger touches the pad. The basic concept of this application was based on changing the overall resistance of the ionic conductor once it got touched by human finger. The human finger also holds a charge which, upon touching the ionic panel, caused an overall change in the value of the resistance. A reference resistance that had equivalent resistance to the sample (untouched) was used to create a potential divider. As both resistances were equivalent, the output voltage was half the input voltage if the sample was untouched. Once the sample was touched, its resistance changed by ΔR and the change in the output voltage was amplified by an amplifier. The output voltage of the amplifier was sensed by the Arduino board, and once the output voltage passed above a certain threshold, the LED turned on.

Removing the finger from the sample caused the resistance and voltage to return to the former state. Consequently, the LED turned off.

The high stability of the conductive elastomer in the open environment and also the stability of the connection between the connecting electrode wires and the conductive elastomer allowed the conductive elastomer to accurately detect the changes due to the touch of the finger to the surface of the conductive elastomer. If the conductive elastomer is not highly stable in the open environment or the connection of the electrode and the ionic panel is not stable, then the changes in the resistance due to these factors could be more than the changes due to the touching of the human finger to the conductive elastomer. The stability of the conductive elastomer therefore enables it to be used with DC current instead of AC, and to generate such accurate signals for long-term stability.

Whilst the foregoing description has described exemplary embodiments, it will be understood by those skilled in the technology concerned that many variations may be made without departing from the present invention.

The invention claimed is:

1. A dielectric elastomeric material having a dielectric constant of 20-65 at $10^3$ Hz and wherein the dielectric elastomeric material is formed from a composition comprising: a polymer comprising at least one acrylate monomer; a cross-linker; and a photoinitiator, wherein the dielectric elastomeric material has a free end bending angle of ≤55°.

2. The dielectric elastomeric material according to claim 1, wherein the dielectric elastomeric material is formed from a composition comprising 5-25 vol % cross-linker based on the total volume of the composition.

3. The dielectric elastomeric material according to claim 1, wherein the at least one acrylate monomer comprised in the composition has a molecular weight of 75-750 g/mol.

4. The dielectric elastomeric material according to claim 1, wherein the dielectric elastomeric material has a Young's modulus of 0.2-0.5 MPa at 20% strain.

5. The dielectric elastomeric material according to claim 1, wherein the dielectric elastomeric material has a glass transition temperature of −15 to −50° C.

6. The dielectric elastomeric material according to claim 1, wherein the dielectric elastomeric material is 3D printable.

7. The dielectric elastomeric material according to claim 1, wherein the at least one acrylate monomer is selected from the group comprising: hydroxypropyl acrylate (HPA), 2-hydroxyethyl acrylate, butyl acrylate, 2-carboxyethyl acrylate, or comonomers thereof.

8. The dielectric elastomeric material according to claim 1, wherein the cross-linker is selected from the group comprising: diethylene glycol, 1,6 hexanediol diacrylate, or mixtures thereof.

9. The dielectric elastomeric material according to claim 1, wherein the composition further comprises a light absorber.

10. A method of forming the dielectric elastomeric material according to claim 1, the method comprising: mixing at least one acrylate monomer with a cross-linker to obtain a mixture; adding a photoinitiator to the mixture to obtain a photocurable mixture; and curing the photocurable mixture to obtain the dielectric elastomeric material.

11. The method according to claim 10, wherein the mixing comprises mixing the at least one acrylate monomer with 5-25 vol % cross-linker based on the total volume of the mixture.

12. The method according to claim 10, wherein the at least one acrylate monomer has a molecular weight of 75-750 g/mol.

13. The method according to claim 10, further comprising adding a light absorber to the mixture prior to the curing.

14. The method according to claim 10, wherein the curing comprises curing under an ultraviolet light source.

15. The method according to claim 10, wherein the method may further comprise 3d-printing the photocurable mixture prior to the curing.

16. A conductive elastomer comprising the dielectric elastomeric material according to claim 1 and an ionic liquid.

17. The conductive elastomer according to claim 16, wherein the ionic liquid is a hydrophobic polar ionic liquid.

18. The conductive elastomer according to claim 16, wherein the conductive elastomer is a near-hysteresis free conductive elastomer.

19. The conductive elastomer according to claim 16, wherein the conductive elastomer is comprised in a sensor.

* * * * *